United States Patent [19]
Narahara et al.

[11] 3,798,361
[45] Mar. 19, 1974

[54] MAGNETIC RECORDING AND/OR REPRODUCING SYSTEM

[75] Inventors: Hisaaki Narahara; Toshihiko Numakura, both of Tokyo; Yoshimi Watanabe, Kanagawa, all of Japan

[73] Assignee: Sony Corporation, Tokyo, Japan

[22] Filed: Nov. 22, 1972

[21] Appl. No.: 308,655

[30] Foreign Application Priority Data

Nov. 26, 1971 Japan .............................. 46-95500

[52] U.S. Cl. .......................... 178/5.4 CD, 178/6.6 A
[51] Int. Cl. .......................... H04n 5/78, H04n 9/32
[58] Field of Search .................... 178/5.4 CD, 6.6 A

[56] References Cited

UNITED STATES PATENTS

| | | | |
|---|---|---|---|
| 3,626,087 | 12/1971 | Tomioka | 178/5.4 CD |
| 3,728,477 | 4/1973 | Kubota | 178/5.4 CD |

*Primary Examiner*—Howard W. Britton
*Attorney, Agent, or Firm*—Lewis H. Eslinger, Esq.; Alvin Sinderbrand, Esq.

[57] ABSTRACT

An improved system for magnetic recording and/or reproducing a color television signal including a luminance signal and a chrominance signal which contains a burst signal therein. Before recording the television signal, the chrominance signal is frequency-converted to a frequency band lower than its original one and the burst signal is extracted from the chrominance signal. The burst signal is then amplitude modulated by a rectangular waveform signal, derived from the horizontal synchronization signal, whose frequency is equal to two scanning line periods. The amplitude modulated burst signal is combined with the luminance signal to frequency-modulate a carrier signal having a predetermined frequency. The frequency-converted chrominance signal is gated by the rectangular wave signal and recorded along with the frequency-modulated signal on a magnetic medium. When the magnetic medium is played back, the frequency-converted chrominance signal is frequency-reconverted to the original frequency band by means of a reference signal the phase of which is controlled by the burst signal reproduced by frequency-demodulation so that phase errors of the reproduced chrominance signal are diminished. The frequency-reconverted chrominance signal is then gated by a rectangular waveform signal derived by detecting the amplitude modulation of the reproduced, frequency demodulated burst signal. The gated, frequency-reconverted chrominance signal is then combined with a portion of the same signal delayed by one scanning line period to produce a continuous chrominance signal.

10 Claims, 15 Drawing Figures

MAGNETIC RECORDING AND/OR REPRODUCING SYSTEM

BACKGROUND OF THE INVENTION

This invention relates generally to a system for magnetic recording or reproducing or both and more particularly to improvements in systems for magnetically recording and reproducing a color television signal which has a luminance signal component and a chrominance signal component that includes a color synchronizing signal component.

In the recording of television signals on magnetic tape, the recording mechanism, known as a video tape recorder (VTR), usually has a rotary magnetic head around which the tape is wrapped along a section of a helical path. As the tape slides along this helical path, the head rotates and records television signal information on a series of parallel tracks disposed at an angle to the longitudinal direction of the tape. The same apparatus may be used to play back previously recorded information by means of heads that follow the recorded tracks.

The color television signals to be recorded are divisible both in frequency and in time. In terms of frequency they are divided into the luminance signal components, which occupy the relatively low frequency portion of the complete color television signal band, and the chrominance signal components and burst signals that occupy the relatively high frequency portions of the band. In terms of time, television signals are divided into field intervals, two of which make up a frame interval, and scanning line intervals. Each line interval includes a blanking interval during which synchronization signals are transmitted to control the scanning apparatus of a color television receiver, and burst signals to synchronize the operation of color sub-carrier signals generated in the television receiver.

It has been found heretofore that it is preferable to separate the luminance and chrominance signals before recording a color television signal. Following such separation, the luminance signal is used to frequency-modulate an oscillator, and the resulting frequency-modulated signal occupies a band somewhat higher than the original luminance signal band. The band of signals including the chrominance and burst signals is frequency-converted to a lower frequency band than the frequency-modulated signal. This rearrangement of the frequency bands occupied by the luminance and chrominance signals makes it possible to utilize the characteristics of the magnetic head and the magnetic tape to produce television pictures of high quality from a magnetic recording.

When a tape on which a signal has been recorded in the manner just described in played back, the chrominance signal component is reconverted to its original frequency band and the frequency-modulated signal is demodulated to produce the luminance signal component. A phase error of the reproduced chrominance signal caused by an error in the relative position of the rotary magnetic head and the angularly disposed tracks recorded on the tape, which phase error would appear as a jitter in the reproduced picture, is compensated for by utilizing the burst signals separated from the reproduced chrominance signal to control a reference signal that has a predetermined frequency and is used for reconverting the chrominance signal to its original band.

However, the burst signal contained in the chrominance band that is frequency-converted to a lower frequency band, is apt to be subjected to amplitude variations and phase variations during the recording and reproduction. For this reason, when the reference signal is phase-controlled by the frequency-converted burst signal, it is difficult to carry out the phase-control correctly because of the aforementioned relative positional error. The result is that it is difficult to obtain a chrominance signal component with no phase error.

It has been the practice to record the television signals on tracks slightly spaced apart on the tape to prevent information in one track from being inadvertently picked up as crosstalk when the adjacent track was being reproduced. The space between tracks is referred to as a guard band, and although it was deemed necessary to prevent crosstalk, it reduces the total surface area of the tape that can be used to record signals.

It has been proposed to avoid or minimize this loss of useful tape area by means of a system disclosed in detail in U.S. application Ser. No. 277,815, filed Aug. 3, 1972 and assigned to the same assignee as the present application. According to that prior application, at least the chrominance signal, which is more likely to produce crosstalk since it is in a lower frequency band than the carrier frequency-modulated by the luminance signal, is recorded intermittently and on a basis such that it is not recorded in one track in an area directly adjacent an area where it is recorded in the next adjacent track. This means that each recorded interval is the same duration as the time between recorded intervals. In this way, signals from adjacent bands which are likely to produce crosstalk are not recorded directly adjacent each other but instead are recorded in a checkerboard fashion so that the guard bands between adjacent tracks may be reduced in width or eliminated entirely. If desired, both the chrominance and luminance signals may be recorded in this intermittent pattern.

In the reproducing equipment, the intermittently recorded signal is combined with a replica of itself that has been delayed for an interval equal to each of the recorded intervals. This combined signal re-establishes an uninterrupted television signal, although half of the signal information in the uninterrupted signal is repeated information.

Hereinafter, a description will be given of the case in which only the chrominance signal is intermittently recorded, or sampled, for alternate line intervals of time. Since the luminance signal is recorded as a frequency-modulated signal in a relatively high frequency band, it is unlikely to produce crosstalk even if it is recorded with no clearance between adjacent tracks or even with a partially overlapping area of adjacent tracks, provided the gap in the recording heads forming the adjacent tracks have different azimuth angles. The reproducing heads must also have corresponding azimuth angles. Since only alternate line intervals of the chrominance and burst signals are recorded, the burst signal reproduced in the reproducing equipment is apt to be subject to phase deviation. In addition, the removal of alternate burst signals makes it more difficult to obtain proper control of the reference signal that is used to frequency-convert the chrominance signal. It is difficult to obtain a stable and positive phase control of the reference signal which is necessary to obtain a reconverted chrominance signal of high quality and without any phase error.

Still another difficulty encountered in some prior systems of this type is that in order to extract the necessary chrominance signal component by gating the reproduced, frequency-reconverted chrominance signal component from reproducing heads at every second line interval and to eliminate crosstalk and noises generated by signals recorded on the adjacent, other line intervals, the gate operation for the reproduced chrominance signal channel must be controlled in such a manner that the gate is only opened at alternate line intervals during which the recorded reproduced chrominance signal component exists. Such a gate operation control is generally achieved by a flip-flop circuit. By way of example, a horizontal synchronizing signal is separated from a demodulated luminance signal component and the separated horizontal synchronizing signal is used to trigger a flip-flop circuit to produce a gate signal which is reversed at every line interval. In this case, in order to extract only a necessary chrominance signal component at a predetermined line interval, a gate signal which can open the gate at the predetermined line interval may be desired. For this purpose, the flip-flop circuit must be controlled in its reversing operation in accordance with the predetermined line intervals during which reproduced chrominance signal components may be obtained.

Accordingly, it is one object of the present invention to provide an improved system for magnetic recording and reproducing of color television signals with maximum utilization of the magnetic tape and with good control of the phase of the reference signal, but without objectionable crosstalk.

It is another object of this invention to provide an improved magnetic recording system for color television signals in which the chrominance signal is recorded and reproduced substantially free of phase errors.

It is still another object of this invention to provide an improved magnetic reproducing system for color television signals to obtain reproduction of the chrominance signals substantially without phase errors.

The foregoing and other objectives, features, and advantages of the invention will be more readily understood upon consideration of the following detailed description of certain preferred embodiments of the invention taken in conjunction with the accompanying drawings.

SUMMARY OF THE INVENTION

In accordance with the present invention, a color television signal to be recorded is separated into its luminance and chrominance signal components. The burst signal is obtained from the chrominance signal band and is added to the luminance signal to form a combined signal that is used to frequency-modulate a carrier wave. The chrominance signal is converted to a lower frequency band than that occupied by the frequency-modulated signal and is combined with the frequency-modulated signal to be recorded on a magnetic medium.

The chrominance signal is gated with a rectangular waveform whose period is substantially equal to twice the scanning line period and which is derived from the horizontal synchronization signal, so that only alternate line intervals of the chrominance signal are recorded. The burst signal is extracted from the chrominance signal prior to the gating, is amplitude modulated by the rectangular wave signal and is then combined with the luminance signal prior to its frequency modulation of the carrier signal. In this way, alternate burst signals are not deleted by the gating operation.

In the reproducing system, the frequency-modulated signal is demodulated and the burst signal is removed, thereby leaving only the reproduced luminance signal. The separated burst signal, after frequency reconversion, is used to control the phase of a reference signal generator that produces the necessary signal to reconvert the frequency of the chrominance signal from the low frequency band, in which it was recorded, to its original higher frequency band. The burst signal is also amplitude detected and the detected signal is used to gate the frequency-reconverted chrominance signal to remove crosstalk generated by the adjacent recorded tracks which occurs during the interval when no chrominance signal is being recorded. The gated, frequency-reconverted chrominance signal is then combined with a portion of the same signal which has been delayed by one scanning line period to produce a continuous chrominance signal. This continuous chrominance signal is then combined with the demodulated luminance signal to form a reconstituted color television signal.

DESCRIPTION OF THE PREFERRED EMBODIMENTS

Figure 1:
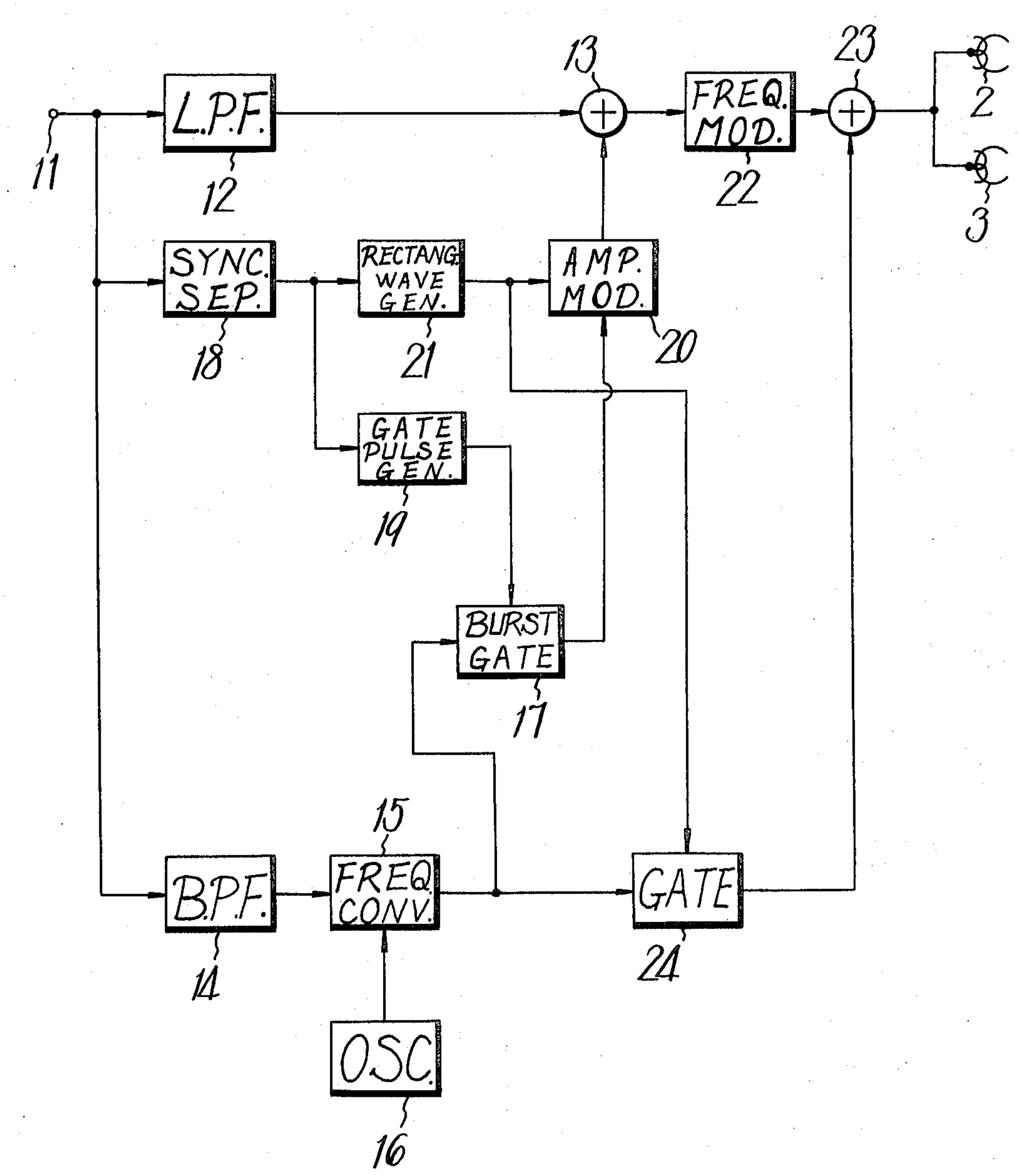
FIG. 1 is a schematic block diagram of a recording system in accordance with the present invention.

An embodiment of a recording system according to the present invention will be now described with reference to FIG. 1. In the figure reference numeral 11 represents an input terminal. A color television signal applied to the input terminal 11 is fed to a low-pass filter 12 which separates a luminance signal component Y shown in FIG. 3A from the color television signal applied thereto. The separated luminance signal component Y is then applied to a mixer 13. The color television signal applied to the input terminal 11 is also applied to a band-pass filter 14 which passes therethrough a chrominance signal component to a frequency converter 15. The frequency converter 15 is also supplied with a reference signal from an oscillator 16 so that the chrominance signal component applied to the frequency converter 15 is frequency-converted with the reference signal to a lower frequency band which has a carrier signal with a frequency of 560 KHz, for example. The chrominance signal which is frequency-converted to a lower frequency band, as shown in FIG. 3B at C, is applied to one input of a burst gate circuit 17.

The color television signal applied to the input terminal 11 is also applied to a synchronizing signal separator 18 which separates a horizontal synchronizing signal therefrom. This separated horizontal synchronizing signal is fed to a burst gate pulse generating circuit 19 which generates a burst gate pulse. The burst gate pulse is then fed to another input of the burst gate circuit 17 which gates the input signal from the frequency converter 15 to produce a burst signal B at every line interval, which has been frequency-converted to a lower frequency band by the frequency converter 15, as shown in FIG. 3C. The gated, burst signal B is then fed to one input of an amplitude modulator 20.

Figures 3A, 3B, 3C, 3D, 3E, 3F, 3G, 3H, 3I, 3J, 3K, 3L, 3M:
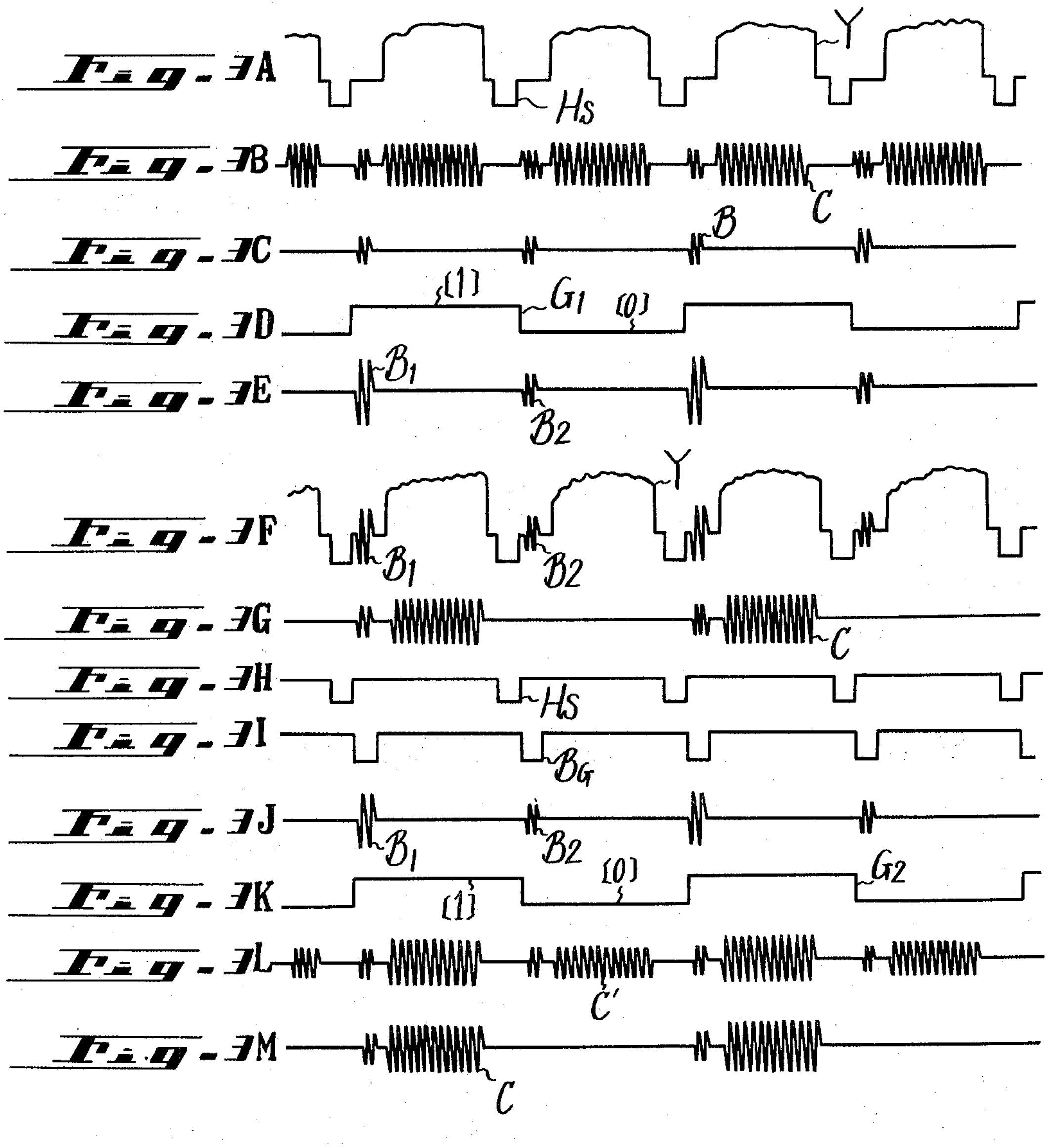
FIGS. 3A–3M, inclusive, are waveform diagrams for use in explaining the operation of the embodiments depicted in FIGS. 1 and 2.

The output from the synchronizing signal separator 18 is also fed to an input of a circuit 21 which produces a rectangular wave signal $G_1$, which reverses in polarity at every horizontal line period, as shown in FIG. 3D, so that it has a frequency period substantially equal to two scanning line periods. The rectangular wave signal $G_1$ is fed to another input of the amplitude modulator 20 which then produces a burst signal $B_1$ which has a relatively high amplitude during a line period [1] of the signal $G_1$ and a burst signal $B_2$ which has a relatively low amplitude during a line period [0] of the signal $G_1$, as shown in FIG. 3E.

The burst signals $B_1$ and $B_2$ thus produced are applied to the mixer 13 and are combined therein with the luminance signal component Y as shown in FIG. 3F. The combined signal is then applied to a frequency modulator 22 which frequency-modulates a carrier signal having a predetermined constant frequency. The frequency modulated output signal from the frequency modulator 22 is applied to a mixer 23.

The chrominance signal component C from the frequency converter 15, having been frequency-converted to a lower frequency band, is fed to a gate circuit 24 which is controlled with the rectangular wave signal $G_1$ from the circuit 21 as a gate signal. Accordingly, the gate circuit 24 passes therethrough the chrominance signal component C during every second line interval, when the burst signal $B_1$ of high amplitude is obtained. This gated chrominance signal component C is applied to the mixer 23 and combined therein with the modulated output signal supplied thereto from the frequency modulator 22. The combined output signal from the mixer 23 is fed to magnetic recording heads 2 and 3 and is then recorded on a magnetic medium, for example, a magnetic tape (not shown).

When the magnetic recording is played back, the frequency-converted burst signal is extracted from the demodulated output of the combined signal. As will be explained in greater detail hereinafter, this separated burst signal is used to control the phase of a reference signal for frequency-reconverting the chrominance signal to its original frequency band.

Figure 2:
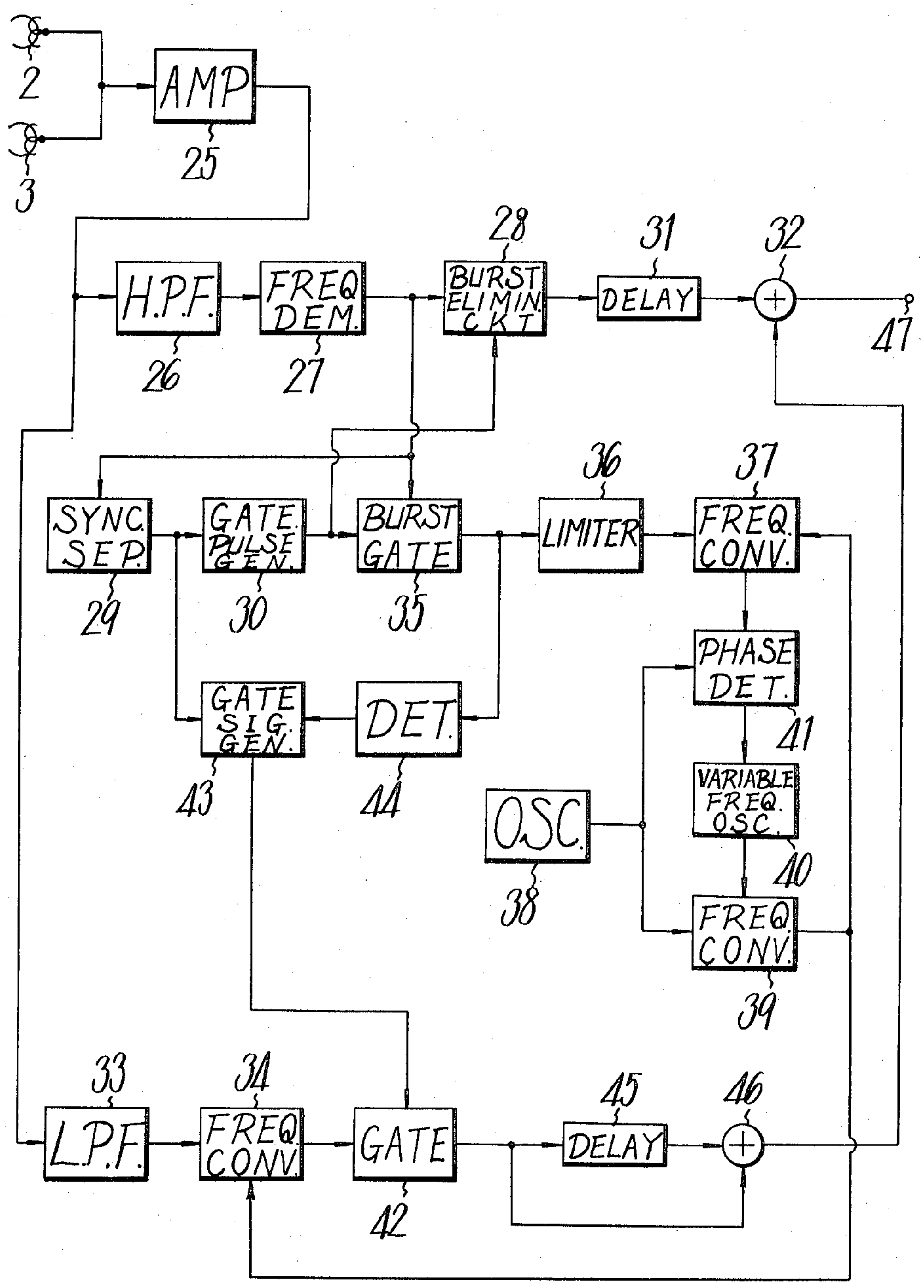
FIG. 2 is a schematic block diagram of a reproducing system in accordance with the present invention.

One embodiment of a reproducing system according to the invention will be now described with reference to FIG. 2. With the embodiment of FIG. 2, reproduced output signals from the magnetic heads 2 and 3 are applied through a reproducing amplifier 25 to a high-pass filter 26 which separates a frequency modulated signal. Thus separated frequency modulated signal is fed to a frequency demodulator 27 which demodulates the modulated signal fed thereto and delivers a combined signal of the chrominance signal Y mentioned above with the burst signals $B_1$ and $B_2$ which are frequency-converted to a lower frequency band and varied in amplitude at every line interval. The combined signal is applied to a burst eliminating circuit 28 as well as a synchronizing signal separator 29 which separates a horizontal synchronizing signal $H_S$ from it as shown in FIG. 3H. The horizontal synchronizing signal $H_S$ is applied to a burst gate pulse generating circuit 30 which generates a burst gate pulse BG shown in FIG. 3I. The burst gate pulse BG is fed to the burst eliminating circuit 28 which then passes therethrough only the luminance signal component Y which is applied through a delay line 31 to a mixer 32.

The output signal from the reproducing amplifier 25 is also applied to a low-pass filter 33 which passes therethrough the chrominance signal component C containing a crosstalk component C'. The chrominance signal component C is frequency-converted to a lower frequency band, as shown in FIG. 3L, by a frequency converter 34.

A burst gate circuit 35 is supplied with the combined signal from the demodulator 27 and also with the burst gate pulse BG from the circuit 30, so that the burst gate circuit 35 delivers the burst signals $B_1$ and $B_2$ which are frequency-converted to a lower frequency band and changed in amplitude at alternate line intervals with a frequency of, for example, 560 KHz. The burst signals $B_1$ and $B_2$ are applied to a limiter 36 to be made constant in amplitude and are then applied to a frequency converter 37 at the regular time during each line blanking interval.

A signal of 3.58MHz from an oscillator 38 is applied to a frequency converter 39 which is also supplied with a signal of, for example, 560 KHz from a variable frequency oscillator 40. Thus, the frequency converter 39 produces a reference signal of 4.14MHz, a frequency higher than 3.58MHz by 560KHz, which is then applied to the frequency converter 37 to produce a burst signal having a converted frequency of 3.58MHz. The burst signal from the frequency converter 37 is fed to a phase detecting circuit 41 which is also supplied with the 3.58MHz signal from the oscillator 38, so that the phase detecting circuit 41 detects an error between both the signals applied thereto. The output signal from the phase detecting circuit 41 is applied to the variable frequency oscillator 40 to control the frequency of the output from the latter. Thus, the variable frequency oscillator 40 is frequency-controlled and hence phase-controlled in accordance with the reference signal from the frequency converter 39. The reference signal is further applied from the frequency converter 39 to the frequency converter 34 which frequency-reconverts the chrominance signal component C to its original frequency band which is phase-controlled and has a carrier frequency of 3.58MHz.

With the system described above, since the phase control of the reference signal for frequency-reconverting the chrominance signal component during reproduction is carried out based upon the frequency-converted burst signal which is mixed with the luminance signal and frequency-modulated before being recorded, the burst signal for phase control is not subjected to amplitude variation and phase deviation. Accordingly, the phase control can be achieved in correct response to phase deviation of the signal which appears during recording and/or reproducing with the result that the reconverted chrominance signal component obtained is of high quality and with no phase error.

The frequency-reconverted chrominance signal component is fed to a gate circuit 42. The horizontal synchronizing signal $H_S$ from the horizontal synchronizing signal separator 29 is fed to one input of a gate signal generation circuit 43 and the burst signals $B_1$ and $B_2$ from the burst gate circuit 35 are applied to an amplitude detecting circuit 44. The detected amplitude signal from the detecting circuit 44 is applied to another input of the gate pulse generating circuit 43. The circuit 43 produces a gate signal $G_2$ which is reversed at alternate line intervals. The signal $G_2$ has a relatively high amplitude [1] during a line period where the burst signal $B_1$ is of high amplitude and a relatively low amplitude [0] where the burst signal $B_2$ is of low amplitude, as shown in FIG. 3K.

The gate signal $G_2$ is then applied to the gate circuit 42 which passes therethrough the chrominance signal component C at every second line interval during which the burst signal $B_1$ of high amplitude is obtained, as shown in FIG. 3M. As is apparent from FIGS. 3L and 3M, this gating eliminates the crosstalk component C′ from the signal during the alternate line periods when no chrominance signal component was recorded. The chrominance signal component C (FIG. 3M) with no crosstalk component thus obtained from the gate circuit 42 is directly applied to a mixer 46 which is also supplied with the chrominance signal component passed through a delay line 45. The delay line 45 delays the chrominance signal component by one scanning line interval, so that the mixer 46 provides a continuous or successive chrominance signal component which is fed to the mixer 32 where it is combined with the luminance signal component Y which has been delayed by an amount corresponding to the time the chrominance signal component is delayed. This combined signal, representing the original color television signal, is delivered to an output terminal 47.

With the present invention described above, when the color television signal is recorded, its chrominance signal component is recorded on the magnetic medium after being sampled, or gated, to make it possible to dispense with a so-called guard band so that the recording area on the magnetic medium can be much increased. Since, in the reproducing equipment, the phase control of the signal for frequency-converting the chrominance signal is carried out based upon the respective burst signal, which is frequency-converted to the low frequency band and combined with the luminance signal and recorded after frequency-demodulation, at every line interval, the phase control is stable and positive. It is thus possible to produce the chrominance signal with high quality and with no phase error.

Further, with the invention the recorded burst signals are changed in amplitude in accordance with the line periods where the chrominance signal component is recorded and not recorded so that even though the signal components recorded on the adjacent tracks are reproduced by magnetic heads having a slightly different azimuth, no crosstalk component due to azimuth loss is mixed into the reproduced signal components. This occurs because upon reproduction the amplitude of the burst signal, which is frequency-demodulated, is detected and the reproduced chrominance signal component is gated in accordance with the gate signal based upon the detected amplitude of the burst signal. Thus the gating of the reproduced chrominance signal component is obtained positively.

The present invention is not limited to the foregoing embodiments. It is also possible to record and/or reproduce the chrominance signal component with separate magnetic heads and to adapt the present invention to the case where signals are recorded on a rotary magnetic sheet.

The terms and expressions which have been employed here are used as terms of description and not of limitation, and there is no intention in the use of such terms and expressions, of excluding equivalents of the features shown and described, or portions thereof, it being recognized that various modifications are possible within the scope of the invention claimed.

What is claimed is:

1. A system for magnetic recording of a composite color television signal having a first band containing a luminance signal and a second band containing chrominance and burst signals, and being divided into intervals including field, line, and blanking intervals, wherein the system comprises:

a. means for separating the luminance signal and the chrominance signal from the composite color television signal;
b. means for frequency-converting the separated chrominance signal to a frequency band lower than its original one;
c. means for extracting the burst signals from the frequency-converted chrominance signal;
d. means for amplitude modulating the extracted burst signals such that successive, alternate burst signals have a first and a second predetermined amplitudes, respectively;
e. means for combining the separated luminance signal and the amplitude modulated burst signals into a combined signal;
f. means for frequency-modulating a carrier signal with the combined signal to produce a frequency-modulated signal;
g. means for gating alternating, substantially equal intervals of the chrominance signal component;
h. means for combining the frequency-modulated signal and the frequency-converted, gated chrominance signal and for recording both of them on a magnetic medium.

2. A system for magnetic recording as recited in claim 1 including, in addition, reproducing means to reproduce the signals recorded on the magnetic medium, the reproducing means comprising:

a. magnetic transducer means for converting the magnetic signals representing the frequency-modulated signal and the recorded intervals of the frequency-converted chrominance signal on the magnetic medium into corresponding electrical signals;
b. means for frequency-demodulating the frequency-modulated electrical signal to produce the combined luminance signal and the frequency converted burst signals;
c. means for extracting the frequency-converted burst signals from the combined signal;
d. means for generating a reference signal to be used for frequency-reconverting the chrominance electrical signal component;
e. means for supplying the extracted burst signals to the reference signal generating means to control the phase of the reference signal;
f. means for frequency-reconverting the recorded intervals of the chrominance electrical signal component with the reference signal to the original frequency band of the chrominance signal;
g. means for delaying the recorded intervals of the chrominance electrical signal component to form delayed replicas of the recorded intervals, and h. means for combining the recorded intervals of the chrominance electrical signals and the delayed replicas to form a continuous chrominance signal.

3. A system for magnetic recording as recited in claim 1, wherein the frequency-converting means is connected to the gating means for gating the frequency-converted chrominance signal component.

4. A system for magnetic recording as recited in claim 3, wherein the gating means is responsive to the means for amplitude modulating the burst signals such that it gates alternate line intervals of the frequency-converted chrominance signal and passes the frequency-converted chrominance signal only during line intervals in which the burst signal is modulated to have the first predetermined amplitude.

5. A system for magnetic recording as recited in claim 4 wherein the composite color television signal further contains a horizontal synchronization signal occuring at regular periods and the means for amplitude modulating the burst signals comprises means for separating the horizontal synchronization signal from the composite color television signal and for generating a rectangular wave shaped gating signal which is synchronized with the horizontal synchronization signal and whose period is substantially equal to twice the period of the horizontal synchronization signal.

6. A system for magnetic recording as recited in claim 5 wherein the rectangular wave shaped signal alternates between a third and a fourth predetermined amplitude in synchronization with successive, alternate, horizontal synchronization pulses.

7. A system for reproducing a color television signal from a recorded signal that includes a carrier which is frequency modulated by a combined signal of a luminance signal and amplitude modulated, frequency-converted burst signals, and a frequency-converted chrominance signal which is gated in response to the amplitudes of the burst signals, the system comprising:

a. transducer means for converting the recorded signal into corresponding electrical signals;
b. means for separating the frequency-modulated signal from the frequency-converted chrominance signal;
c. means for frequency-demodulating the frequency-modulated signal to obtain the luminance signal and the frequency-converted burst signals;
d. means for generating a reference signal, including means for controlling the phase of the reference signal by the frequency-converted burst signals;
e. means for utilizing the reference signal to frequency-reconvert the frequency-converted chrominance signal;
f. means for amplitude detecting the frequency-converted burst signal to produce a gating signal which is synchronized with the frequency-converted burst signals and has a period which is substantially equal to twice the interval period between successive frequency-converted burst signals;
g. means responsive to the gating signal for gating the frequency-reconverted chrominance signal;
h. means for combining the gated, frequency-reconverted chrominance signal with the luminance signal to produce a color television signal representative of an original composite color television signal.

8. A system as recited in claim 7, wherein the reference signal generating means comprises:

a. an oscillator for generating a constant frequency signal;
b. a phase detector for comparing the phase of the constant frequency signal with the phase of the frequency-reconverted burst signal;
c. a variable frequency oscillator controlled by the output of the phase detector; and
d. a frequency converter responsive to the phase detector output for converting the frequency of the constant frequency signal into the reference signal.

9. A system as recited in claim 7 further comprising means for delaying the gated, frequency-reconverted chrominance signal to form delayed replicas thereof and means for combining the gated, frequency-reconverted chrominance signal with the delayed replicas thereof to form a substantially continuous chrominance signal.

10. A system as recited in claim 9 wherein the recorded, frequency-modulated combined signal further includes horizontal synchronization signals and the means for producing a gating signal further comprises means for extracting the horizontal synchronization signals from the frequency-demodulated combined signal, means responsive to the amplitude of the frequency-converted burst signals for producing an amplitude detected signal, and means responsive to the amplitude detected signal and the horizontal synchronization signals for producing the gating signal to have a rectangular wave form with a period which is substantially equal to the combined periods between two successive horizontal synchronization signals and having an amplitude determined by the amplitudes of the frequency-converted burst signals.

* * * * *